(12) United States Patent
Fry

(10) Patent No.: US 10,266,239 B2
(45) Date of Patent: Apr. 23, 2019

(54) RELATING TO SURFBOARDS

(71) Applicant: Richard Bruce Fry, Auckland (NZ)

(72) Inventor: Richard Bruce Fry, Auckland (NZ)

( * ) Notice: Subject to any disclaimer, the term of this patent is extended or adjusted under 35 U.S.C. 154(b) by 0 days.

(21) Appl. No.: 15/994,198

(22) Filed: May 31, 2018

(65) Prior Publication Data

US 2018/0346078 A1    Dec. 6, 2018

(30) Foreign Application Priority Data

May 31, 2017   (NZ) ........................... 732396

(51) Int. Cl.
| | | |
|---|---|---|
| *B60L 15/20* | (2006.01) | |
| *B60L 11/00* | (2006.01) | |
| *B63H 21/17* | (2006.01) | |
| *B63B 1/00* | (2006.01) | |
| *B63B 35/00* | (2006.01) | |
| *B63B 35/79* | (2006.01) | |
| *B63H 5/14* | (2006.01) | |

(52) U.S. Cl.
CPC ...... *B63B 35/7943* (2013.01); *B63B 35/7926* (2013.01); *B63H 5/14* (2013.01)

(58) Field of Classification Search
CPC . B63B 35/79; B63B 35/7926; B63B 35/7943; B63B 2035/79; B63B 2035/7903; B63H 5/14
USPC ........................................... 441/79; 440/6, 7
See application file for complete search history.

(56) References Cited

U.S. PATENT DOCUMENTS

| | | | | |
|---|---|---|---|---|
| 3,371,646 A | * | 3/1968 | Mela ..................... | A63B 35/12 114/55.58 |
| 3,405,677 A | * | 10/1968 | Smith ................. | B63B 35/7943 114/55.53 |
| 3,456,613 A | * | 7/1969 | Smith ................. | B63B 35/7943 440/6 |
| 3,536,025 A | * | 10/1970 | Tierney .................... | B63B 3/38 440/6 |

(Continued)

FOREIGN PATENT DOCUMENTS

DE         3139816 A1      5/1983

OTHER PUBLICATIONS

First Examination Report from NZ Patent Application No. 732396, dated Nov. 10, 2017.

(Continued)

*Primary Examiner* — Daniel V Venne
(74) *Attorney, Agent, or Firm* — Greer, Burns & Crain, Ltd.

(57) ABSTRACT

A fin for a surfboard having a base and a tip and wherein the fin includes an integral tunnel which provides a tubular housing; an electric motor and associated propeller attached to the integral tunnel so as to be substantially enclosed therein; wherein the integral tunnel and propeller are both positioned so that there is a blade section above and below the integral tunnel which each have a height which is at least substantially 70% of the diameter of the integral tunnel, and wherein the motor and the propeller are positioned forward of a rear edge of the fin. Also provided is a power source to supply power to the electric motor and associated housing and mounting plate. The arrangement of the motor and propeller are located forward of a rear edge of the fin allows the original feel and maneuverability of a non-powered surfboard to be preserved.

8 Claims, 8 Drawing Sheets

(56) References Cited

U.S. PATENT DOCUMENTS

| | | | | |
|---|---|---|---|---|
| 6,178,905 B1 * | 1/2001 | Dynes | ................. | B63B 1/285 |
| | | | | 114/55.54 |
| 6,183,333 B1 * | 2/2001 | Hall | ................. | A63H 13/045 |
| | | | | 144/144 A |
| 6,409,560 B1 * | 6/2002 | Austin | ............... | B63B 35/7943 |
| | | | | 440/6 |
| 6,901,872 B1 * | 6/2005 | Battle | ............... | B63B 35/7943 |
| | | | | 114/55.56 |
| 7,207,282 B1 | 4/2007 | Ruan et al. | | |
| 8,636,552 B2 * | 1/2014 | Braden | ............... | B63H 21/17 |
| | | | | 440/6 |
| 8,702,458 B2 | 4/2014 | Preston | | |
| 9,359,044 B2 * | 6/2016 | Langelaan | ............ | B63H 21/17 |
| 10,000,266 B1 * | 6/2018 | Terada | ................. | G06F 3/00 |
| 2002/0072285 A1 | 6/2002 | Jung | | |
| 2002/0124783 A1 * | 9/2002 | Dynes | ................. | B63B 1/285 |
| | | | | 114/55.54 |
| 2003/0167991 A1 | 9/2003 | Namanny | | |
| 2004/0139905 A1 * | 7/2004 | Chen | ................. | B63B 1/246 |
| | | | | 114/274 |
| 2011/0003521 A1 | 1/2011 | Roman | | |
| 2013/0104787 A1 | 5/2013 | Roman | | |
| 2015/0104985 A1 | 4/2015 | Langelaan | | |
| 2015/0336649 A1 | 11/2015 | Radenbaugh et al. | | |

OTHER PUBLICATIONS

Second Examination Report from NZ Patent Application No. 732396, dated Jan. 23, 2018.
Third Examination Report regarding Postponed Acceptance from NZ Patent Application No. 732396, dated Mar. 12, 2018.

* cited by examiner

RELATING TO SURFBOARDS

BACKGROUND

The present invention relates to improvements in and relating to surfboards and fittings therefor.

Surfboards typically consist of a fiberglass board having one or more fins (skegs) on the underside thereof at the tail end of the board.

To catch a wave requires a surfer to use the arms to manually paddle the board to build up speed so the board can accelerate down the wave and does not simply slip over the wave as it passes.

Understandably, getting your board up to the speed of the wave can be exhausting.

Additionally, it can make surfing difficult to those suffering from, or recovering from, arm injuries.

Previous attempts to address the foregoing problems all suffer from a number of drawbacks.

For example:

U.S. Pat. No. 8,702,458 discloses a fin with a motor therein. However, the motor is positioned directly adjacent the bottom surface of the surfboard. The inventor found that this arrangement to be unsatisfactory as it caused the motor to be inefficient and lack thrust as the motor is placed in the path of water disturbance (via air vortices/bubbles) formed as the board pushes carves through the water thus the placement of the motor in U.S. Pat. No. 8,702,458 undermines any useful benefits that the inclusion of a motor in the fin might otherwise have offered. Furthermore, the U.S. Pat. No. 8,702,458 invention requires modification of the board to create a housing for a power source which again alters the weight, feel and handling characteristics of the board.

US 20030167991 also discloses a motor in a fin for surfboard. But again this motor is positioned adjacent the bottom surface of the surfboard and thus prone to the same problems discussed above for U.S. Pat. No. 8,702,458. In addition, this motor projects from the rear of the fin meaning it can easily get tangled and caught up with the tether rope which can fit in the gap between the bottom of the surfboard and the top of the motor housing. This is understandably problematic. However, a major shortcoming in the US 20030167991 invention is the power supplied by the batteries and the position of the power source at the front end of the motor itself. The present inventor has found that you actually need around 97 W of power to provide 1 hour of continuous use of the motor. The NiCad batteries used in US 20030167991 would require around 12 batteries and the housing would project a long way (i.e. approximately 30 cm or more) forward of the front edge of the fin. This would affect the surfing performance of the surfboard.

Other motorised surfboards are known but they require a custom made surfboard with cavities therein for housing the motor and/or power source. Many of the motorised surfboard systems that exist today are not designed for wave powered surfing but more for artificially powered movement of the surfboard. Such systems thus detrimentally impact or prevent the ability to actually surf on a wave because the focus was on providing thrust to a board from a motor and requiring any board acceleration from a wave was not a consideration.

Despite the previous serious shortcomings of the motorised fins discussed above not working the inventor surprisingly found that a motorized fin could still be designed which could function in a manner that overcame the shortcomings and enabled surfers to catch waves. And importantly the motorised fin would still not detract from the overall surfing experience and feel of the board when surfing despite the addition of a motor to the fin and a long lasting power source to the board.

It is an object of the present invention to address the foregoing problems or at least to provide the public with a useful choice.

Additionally, it would also be useful if there could be provided a retrofit solution enabling a motorized fin to be easily added to and/or removed from, a standard surfboard without damaging the surfboard.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

Definitions

The term 'midline' as used herein refers to the median line or plane of bilateral symmetry with respect to the height of the fin measured from the underside of the surfboard when attached thereto.

The term 'tunnel' as used herein refers to a hollow tubular housing or conduit which is open at both ends.

SUMMARY

According to one aspect of the present invention there is provided a fin for a surfboard having a base and a tip and wherein the fin includes:

an integral tunnel which provides a tubular housing;

an electric motor and associated propeller attached to said integral tunnel so as to be substantially enclosed therein;

wherein the integral tunnel and propeller are both positioned so that there is a blade section above and below said integral tunnel which each have a height which is at least substantially 70% of the diameter of the integral tunnel, and wherein the motor and the propeller are positioned forward of a rear edge of the fin.

In some embodiments, the blade sections provide sufficient lateral surface area to function together as a fin for a surfboard.

In some embodiments, at least one end of the tunnel is curved or angled to substantially conform to a curved edge of the fin—i.e. a curved edge of the blade sections of the fin.

In some embodiments a rear end of the tunnel is curved or angled to substantially conform to a curve of a rear edge of the fin—i.e. a curve of a rear edge of the blade sections. In some embodiments, a front edge of the tunnel is curved or angled to substantially conform to a curve of a front edge of the fin, i.e. a curve of a front edge of the blade sections.

In some embodiments, the propeller is located between a front edge and a rear edge of the fin—i.e. front and rear edges of the blade sections of the fin.

According to a second aspect of the present invention there is provided a fin for a surfboard having a base and a tip and wherein the fin includes:
   an integral tunnel which provides a tubular housing;
   an electric motor and associated propeller attached to said integral tunnel so as to be substantially enclosed therein;
   a blade section above and below the tunnel;
   wherein the integral tunnel and propeller are both positioned so that respective central longitudinal and rotational axes of the integral tunnel and the propeller are located:
      on the centerline of the fin;
      along the horizontal midline axis of the fin.

The second aspect of the present invention may include any one or more features described above with reference to the first aspect of the present invention.

According to a third aspect of the present invention there is provided a fin for a surfboard having a base and a tip and wherein the fin includes:
   an integral tunnel which provides a tubular housing;
   a blade section above and below the integral tunnel providing the base and tip;
   an electric motor and associated propeller attached to said integral tunnel so as to be substantially enclosed therein;
   wherein the blade sections provide sufficient lateral surface area to function together as a fin for a surfboard.

The third aspect of the present invention may include any one or more features described above with reference to the first aspect of the present invention.

According to a fourth aspect of the present invention there is provided a surfboard which includes a fin as described above with reference to the first, second or third aspects of the present invention.

According to a fifth aspect of the present invention there is provided a surfboard which includes a fin as described above with reference to the first, second or third aspects of the present invention, the surfboard including a control switch—coupled to a power source or motor—to turn the motor on and off.

In some embodiments, the control switch is in the form of a pneumatic pad and associated air switch.

According to a sixth aspect of the present invention there is provided a removable kit for reversibly modifying a surfboard which includes:
   a fin as described above with reference to the first, second or third aspects of the invention;
   a housing for a power source having a mounting plate with base connection holes therein;
   double sided tape;
   a base plate with threaded apertures aligned with base connection holes in said housing;
   foam surfboard grip to cover base plate with holes therein aligned with apertures in base plate;
   at least one control switch.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1:
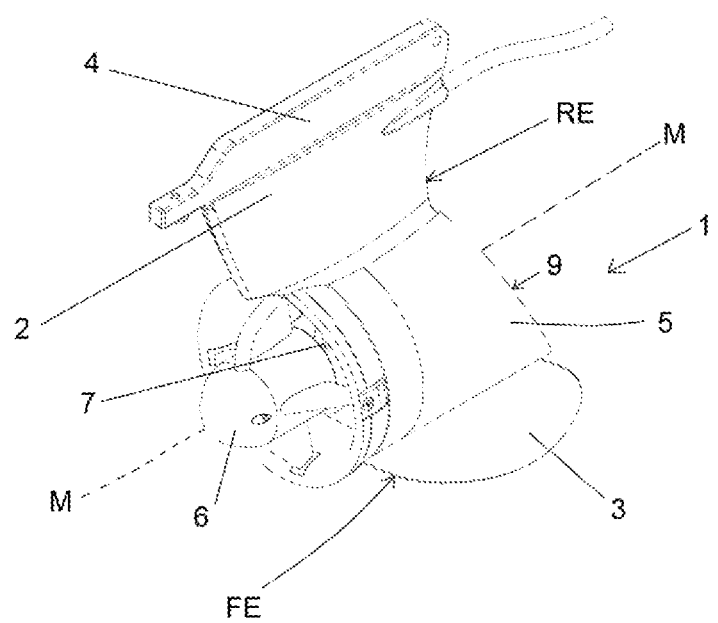
FIG. 1 Shows a top front perspective view of a fin in accordance with one preferred embodiment of a first aspect of the present invention.
Figure 2:
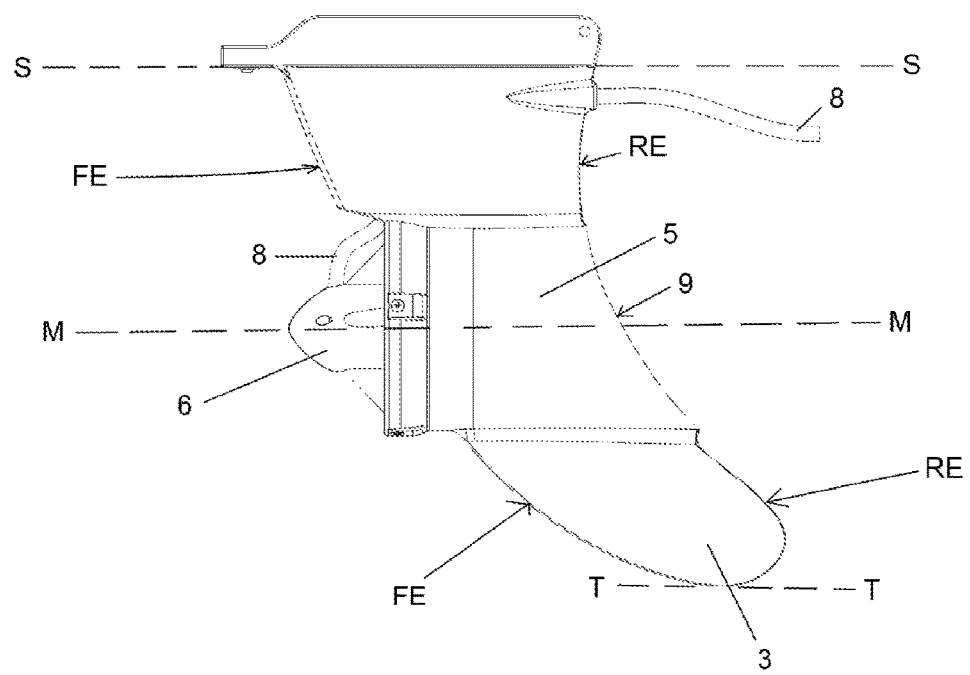
FIG. 2 Shows a side view of the fin shown in FIG. 1.

In relation to FIGS. 1-5 there is provided a fin 1 for a surfboard (not shown) the fin has a base portion 2 and a tip portion 3. The fin 1 has an insert portion 4 which fits within a slot in the underside of a surfboard (not shown). The fin has a front edge FE and a rear edge RE.

The fin 1 also has a tunnel in the form of a cylinder 5 which has its central longitudinal axis located on the midline M-M of the fin 1 when attached to a surfboard. The horizontal midline axis M-M being the midpoint measured from the underside S-S of the surfboard (not shown) to the distal end of the tip portion indicated by line T-T. Preferably a distance between the central longitudinal axis of the tunnel 5 and the horizontal midline of the fin is less than 10% of the total height of the fin from the underside S-S of the surfboard to the distal end of the tip portion 3. This vertical position of the cylinder 5 ensures the cylinder does not interfere with the rideability or handling of the surfboard. The vertical position of the cylinder ensures the fin replicates the feel of surfing with a conventional fin.

Figure 3:
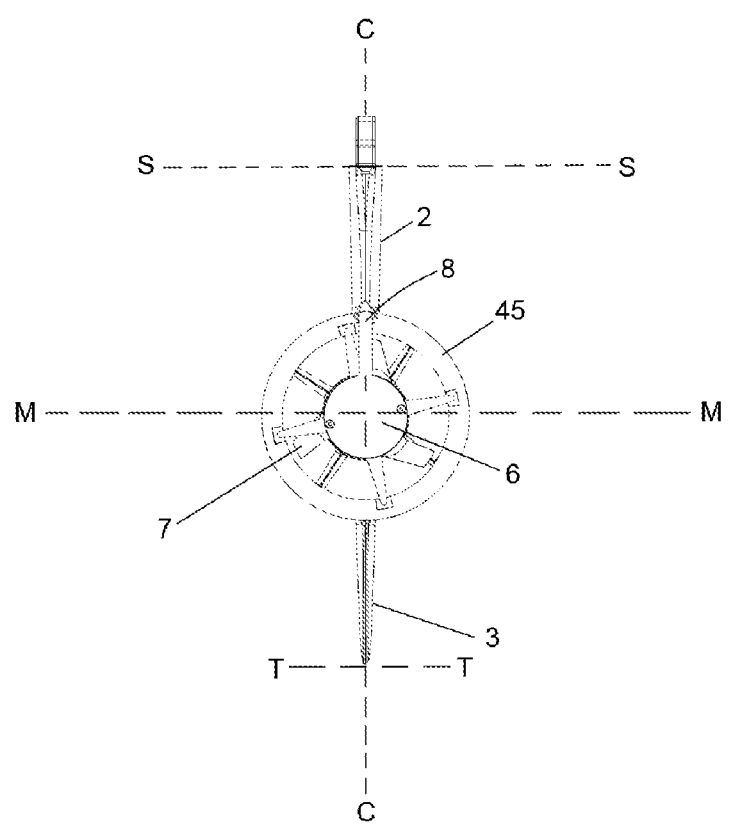
FIG. 3 Shows a front view of the fin in FIGS. 1 and 2.
Figure 4:
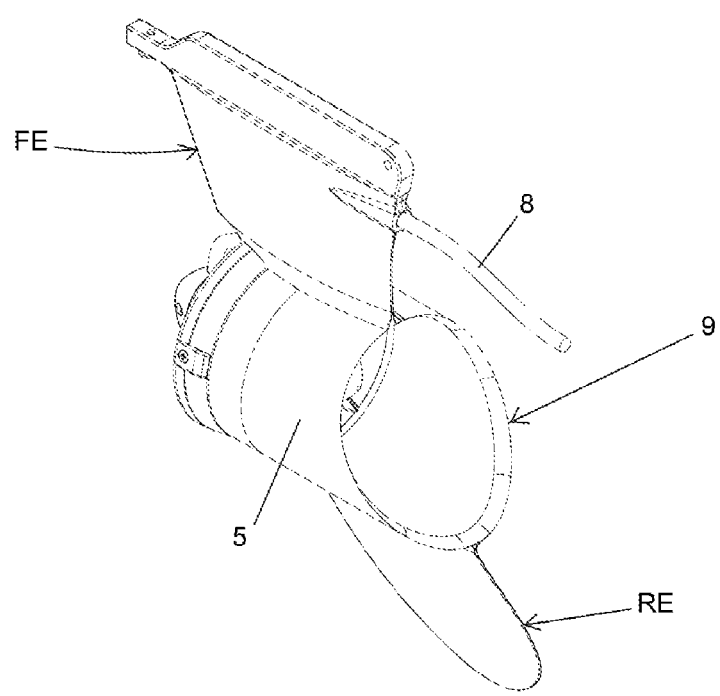
FIG. 4 Shows a rear perspective view of the fin shown in FIGS. 1-3.

The cylinder 4 also has its central longitudinal axis located on a lateral centerline C-C of the fin 1 shown most clearly in FIG. 3.

Figure 6:
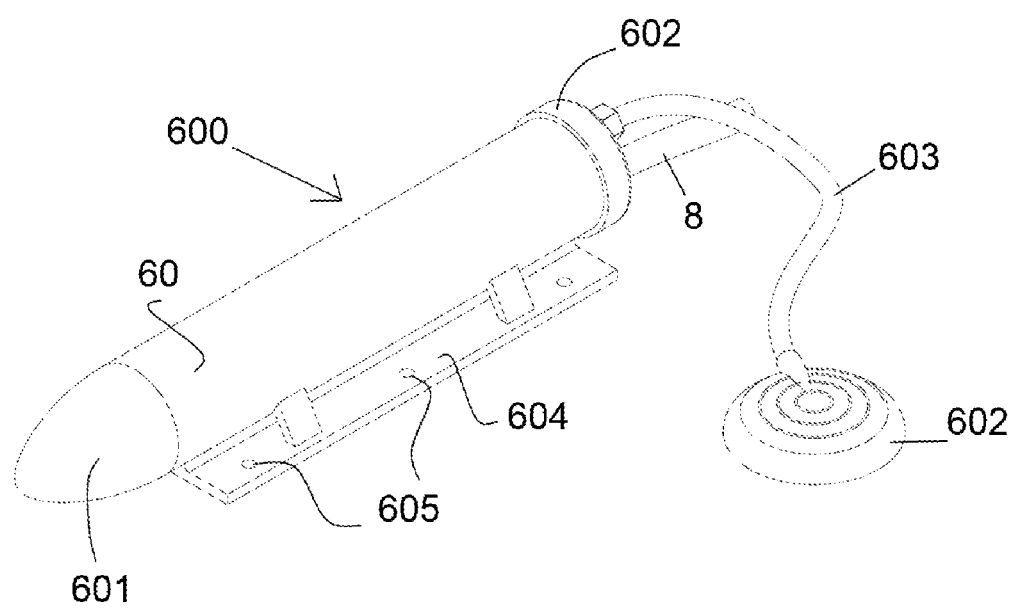
FIG. 6 Shows a top front perspective view of a housing in accordance with one preferred embodiment of a third aspect of the present invention.
Figure 7:
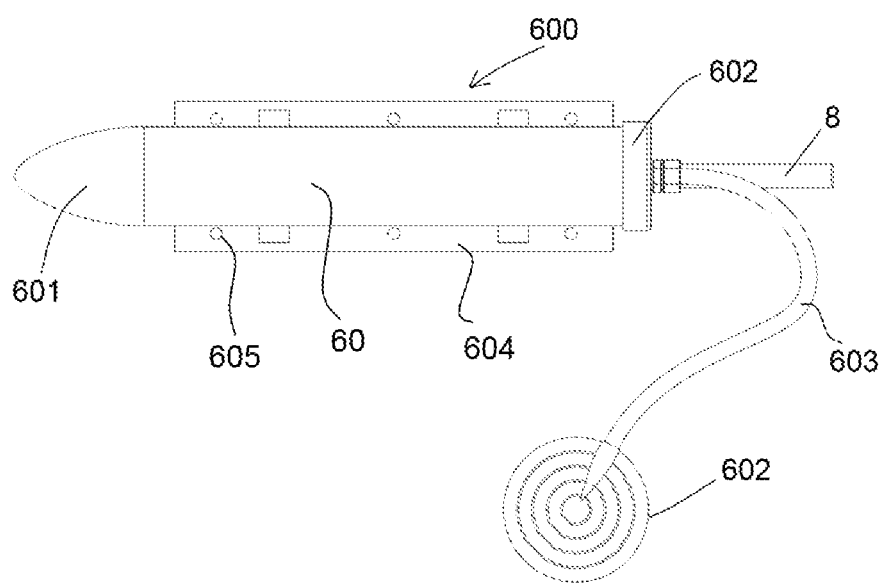
FIG. 7 Shows top view of the housing shown in FIG. 6.
Figure 8:
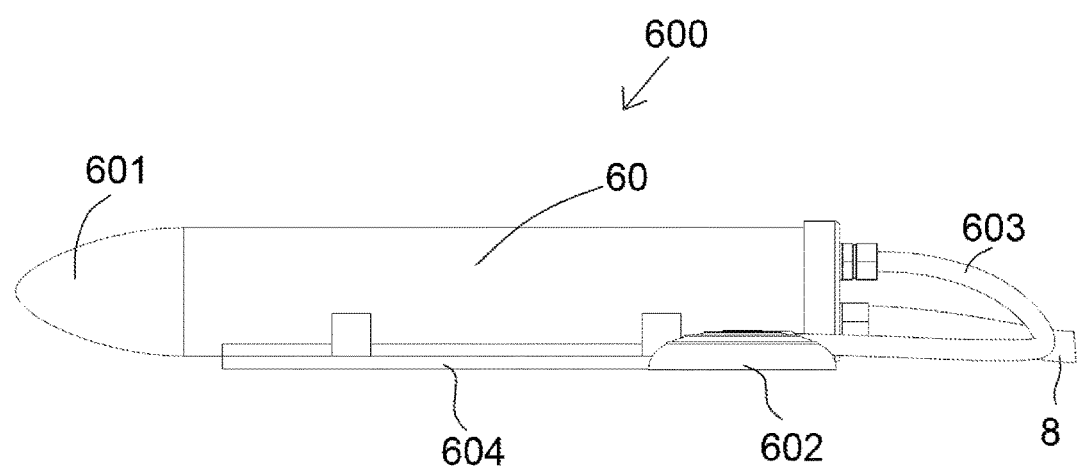
FIG. 8 Shows a side view of the housing shown in FIGS. 6 and 7.

The fin has an electric motor 6 and associated propeller 7 in the form of a Blue Robotics™ thruster. The electric motor 6 drives rotation of the propeller on the central longitudinal axis of the cylinder 5. The motor may be supported within the cylinder 5 by struts extending from an inside of the cylinder 5. The struts are spaced apart around an inner circumference of the cylinder. In the illustrated embodiment the fin has four equispaced struts extending between the motor 6 and cylinder 5. The motor may comprise an assembly including a duct that extends around the propeller. The duct may attach to and form part of the tunnel 5 of the fin. Preferably, at least a portion of the integral tunnel is integrally formed with a blade section of the fin above and/or below the cylinder. The electric motor 6 is coupled to a power source discussed later in relation to FIGS. 6-8 via a power cord 8.

As can be seen the cylinder 5 of the tubular housing in which the propeller 7 is located has a rear edge 9 which is curved to substantially conform to the curve of the rear edge RE of the fin 1, i.e. the rear edge of blade sections of the fin above and below the cylinder. In some embodiments the front edge of the cylinder may be curved to substantially conform to the curve of the front edge FE of the fin 1.

As shown in the Figures, the propeller is located within the cylinder forward of the rear edge RE of the fin. The motor 6 is also located forward of the rear edge RE of the fin. When surfing on a wave, the surfer riding the board turns the board by tilting the board and shifting the surfer's body weight. As the board turns on the fin, the location of the fin on the board is important to how well the board rides and turns. Adding a motor and propeller to a board can substantially affect the way the board rides. The inventor has found that the original feel and maneuverability of a non-powered surfboard can be preserved by locating the propeller 7 within the cylinder 5 forward of the rear edge RE of the fin 1. In the most preferred embodiment, the propeller 7 is located between the front edge FE and the rear edge RE of the fin 1.

Figure 5:
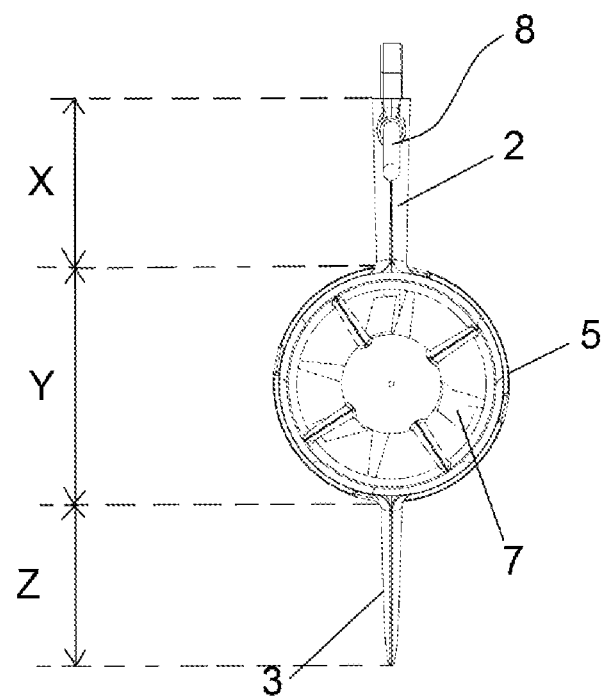
FIG. 5 Shows a rear view of the fin shown in FIGS. 1-4.

As can be seen in FIG. 5 the length (height) of blade sections which form the base portion 3 and tip portion 2 respectively shown by double headed arrows X and Z are approximately around 70% of the diameter of the tubular housing 5 shown by double headed arrow Y. Preferably, the height of each blade section above and below the cylinder is at least 70% of the diameter of the cylinder 5. This arrangement also helps to preserve the rideability of the board, by presenting sufficient lateral surface area above and below the cylinder 5. For example, the cylinder 5 may have an outside dimeter of about 100 mm and each of the blade sections a height of about 70 mm (or more), the total fin height from the underside S-S of the surfboard to the tip about 240 mm (or more). The blade sections 2, 3 provide sufficient lateral surface area to function together as a fin for a surfboard FIGS. 6-8 there is shown a housing 600 for a power source which has been made from a plastic cylinder 60.

The housing 600 has a pointed end 601 which is substantially bullet shaped (a pointed closed curved end) at a front end thereof and an end cap 602 at a rear end thereof. The end cap has two apertures which respectively connect to an air tube 603 and a power cord 8.

The housing 600 contains a power source in the form of one 18.5 volt lithium polymer rechargeable battery that delivers one-hour continuous run time, pushing the board and surfer at approximately 5 km/h. (not shown). The housing being located on a deck of a surfboard (not shown) and the power source being connected to the electric motor 6 (shown in FIG. 1) via power cord 8 as aforementioned. The supply of power from the power source to the electric motor is controlled by a pneumatic pad 602 connected to the power source via hollow tube (603) and an associated air switch (not shown) which connects or disconnects current from the power source to the electric motor.

The power cord may extend from the fin from the rear edge RE of the blade section of the fin above the cylinder. The cord may extend from the rear edge RE adjacent the bottom surface S-S of the board. The cord 8 may extend from the motor 6 to a front edge FE of the fin 1 to extend through the upper blade section to the rear edge RE of the fin 1.

The housing 600 has a mounting plate 604 with base connection apertures 605. The mounting plate is screwed via bolts to a nylon plastic base plate (not shown) having threaded apertures aligned with the base connection apertures. The base plate is stuck to the deck of a surfboard with 3M™ marine double sided tape (not shown). Prior to, affixing the double sided tape to the deck of the surfboard any wax thereon is first removed.

The integral tunnel formed in the fin may have a variety of different configurations without departing from the scope of the present invention.

In a preferred embodiment the tunnel may be in the form of a cylinder.

It will be appreciated that the integral tunnel may have different shaped cross sectional profiles. For example, only, the tunnel may be: rectangular; hexagonal; triangular; octagonal; or dodecahedral.

The fin may come in a variety of different shapes and sizes without departing from the scope of the present invention.

The fin may have a length from base to tip when measured from the underside of a surfboard which provides a substantially planar 'blade section' above and below the tubular housing of sufficient length for the fin to still function as a stabilizer.

Preferably, the length (or height) of the respective 'blade sections' for the base portion and tip portion of the fin may be at least approximately 70% of the diameter of the tubular housing.

In preferred embodiments the housing may be waterproof to a depth of at least 5 meters.

Most preferably the housing may be waterproof to a depth of 10 m.

The electric motor may be turned on and off via at least one control switch.

In some embodiments the electric motor may be configured to receive wireless signals which turn the motor on and off and/or control the speed of the motor.

The form of the control switch may vary without departing from the scope of the present invention.

In some embodiments the control switch may be in the form of a handheld control module with an on/off button and the control module may be configured to wirelessly communicate with motor or power source to control the supply of power to the motor.

In preferred embodiments the control switch may be in the form of a pneumatic pad and associated air switch.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What I claim is:

1. A fin for a surfboard having a base and a tip and wherein the fin comprises:
   an integral tunnel which provides a tubular housing;
   an electric motor and associated propeller attached to said integral tunnel so as to be substantially enclosed therein;
   wherein the integral tunnel and propeller are both positioned so that there is a blade section above and below said integral tunnel which each have a height which is at least substantially 70% of the diameter of the integral tunnel,
   and wherein the motor and the propeller are positioned forward of a rear edge of the fin.

2. A fin as claimed in claim 1, wherein at least one end of the tunnel is curved or angled to substantially conform to a curved edge of the fin.

3. A fin as claimed in claim 1, wherein a rear end of the tunnel is curved or angled to substantially conform to a curve of a rear edge of the fin.

4. A fin as claimed in claim 1, wherein the propeller is located between a front edge and a rear edge of the fin.

5. A surfboard which includes a fin as claimed in claim 1.

6. A surfboard as claimed in claim 5, which includes a control switch—coupled to a power source or motor—to turn the motor on and off.

7. A surfboard as claimed in claimed claim 6, wherein the control switch is in the form of a pneumatic pad and associated air switch.

8. A removeable kit for reversibly modifying a surfboard which comprises:
   a fin as claimed in claim 1;
   a housing for a power source having a mounting plate with base connection holes therein;
   double sided tape;
   a base plate with threaded apertures aligned with base connection holes in said housing;
   foam surfboard grip to cover base plate with holes therein aligned with apertures in base plate;
   at least one control switch.

\* \* \* \* \*